United States Patent
Feng et al.

(10) Patent No.: US 11,767,403 B2
(45) Date of Patent: Sep. 26, 2023

(54) METHOD FOR CONTROLLING THERMOPLASTICITY AND TOUGHNESS OF REDOX-MODIFIED PLANT FIBER AND USE THEREOF

(71) Applicant: SOUTH CHINA UNIVERSITY OF TECHNOLOGY, Guangzhou (CN)

(72) Inventors: Yanhong Feng, Guangzhou (CN); Hang Cheng, Guangzhou (CN); Bo Lei, Guangzhou (CN); Xinliang Zou, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 850 days.

(21) Appl. No.: 16/722,297

(22) Filed: Dec. 20, 2019

(65) Prior Publication Data
US 2020/0199305 A1 Jun. 25, 2020

(30) Foreign Application Priority Data
Dec. 24, 2018 (CN) .......................... 201811584974.3

(51) Int. Cl.
*C08J 3/00* (2006.01)
*C08J 3/18* (2006.01)
*D21B 1/02* (2006.01)

(52) U.S. Cl.
CPC ................ *C08J 3/18* (2013.01); *D21B 1/021* (2013.01); *C08J 2397/02* (2013.01)

(58) Field of Classification Search
None
See application file for complete search history.

(56) References Cited

U.S. PATENT DOCUMENTS

2013/0096236 A1* 4/2013 Bernaerts .................. C08L 3/02
524/48

FOREIGN PATENT DOCUMENTS

CN    101885231 A  *  11/2010  ............ B29C 48/40
CN    107363953 A  *  11/2017

OTHER PUBLICATIONS

CN-107363953-A, English translation, Nov. 2017 (Year: 2017).*
CN-101885231-A, English translation (Year: 2010).*

* cited by examiner

*Primary Examiner* — Stefanie J Cohen
(74) *Attorney, Agent, or Firm* — TROUTMAN PEPPER HAMILTON SANDERS LLP; Christopher C. Close, Jr.

(57) ABSTRACT

The present disclosure relates to a method for controlling thermoplasticity and toughness of a redox-modified plant fiber, comprising following steps: (1) pretreating a plant fiber; (2) obtaining an oxidation-modified plant fiber by adding an oxidant solution, then filtering, and washing; and obtaining the redox-modified plant fiber by adding a reductant solution, then filtering, and washing; and (3) fully mixing a plasticizer with the redox-modified plant fiber; the plasticizer being a hydroxyl plasticizer, an ionic liquid plasticizer, a deep eutectic solvent, an ester plasticizer, an amine plasticizer, a glycidyl plasticizer, or an inorganic salt plasticizer. The method according to the present disclosure can improve the toughness of the redox-modified plant fiber material, reduce the processing temperature of the plant fiber material, and broaden the processing window of the plant fiber material.

19 Claims, 3 Drawing Sheets

METHOD FOR CONTROLLING THERMOPLASTICITY AND TOUGHNESS OF REDOX-MODIFIED PLANT FIBER AND USE THEREOF

TECHNICAL FIELD

The present disclosure relates to the field of natural polymer materials, and particularly to a method for controlling thermoplasticity and toughness of a redox-modified plant fiber and use thereof.

BACKGROUND

Since the 20th century, mass production of petroleum-based polymer materials has caused shortage of petroleum resources and serious environmental pollution. An eco-friendly polymer material with excellent performances prepared from plant fiber resources with abundance, biodegradability and wide sources, can partially replace petroleum-based polymers. It will effectively solve the increasingly severe resource and environmental concerns.

During prolonged evolution, three components in the plant fiber interwove into a complicated and compact micro-nano compound structure. This results the plant fiber cannot be melt-processed at a high temperature because the three major components have been degraded prior to melting. Conventional esterification and etherification can achieve thermoplastic processing of a plant fiber, but large amounts of anhydride and organic solvents are used during modification, which will result in the environment pollution and increases in the equipment costs and the recycling costs. In addition, it also causes material degradation to a great extent, and results in poor mechanical properties of materials.

In view of the above problems, a method related to oxidation and reduction reaction for thermoplastic modification of a lignocellulose and use thereof disclosed in CN 201710662662.9, which can better retain strength of the modified material itself. The glass transition temperature of thermoplastic modified plant fiber is 90-110° C., which thereby can achieve its thermoplastic processing. However, the processing temperature of plant fiber modified with this method is still high, and the processing temperature window is still narrow. In addition, the prepared plant fiber material is rigid and have poor toughness.

SUMMARY

On this basis, it is necessary to provide a method for controlling thermoplastic processability and toughness of a redox-modified plant fiber in order to achieve better thermoplastic processability and broader processing temperature window of the redox-modified plant fiber. The redox-modified plant fiber can therefore be hot press molded at a lower temperature and obtained materials with better toughness.

In order to achieve the above object, the present disclosure provides the following technical solutions.

A method for controlling thermoplasticity and toughness of a redox-modified plant fiber includes the following steps:
(1) pretreating a plant fiber;
(2) oxidation-modifying the pretreated plant fiber, and reduction-modifying the oxidation-modified plant fiber, to obtain the redox-modified plant fiber; and
(3) fully mixing a plasticizer with the redox-modified plant fiber; the plasticizer being a hydroxyl plasticizer, an ionic liquid plasticizer, a deep eutectic solvent, an ester plasticizer, an amine plasticizer, a glycidyl plasticizer, or an inorganic salt plasticizer.

The present disclosure further provides a modified plant fiber material with thermoplasticity and toughness. The specific technical solution is as follows:

A modified plant fiber material with thermoplasticity and toughness is prepared by drying and hot pressing the processed plant fiber with the method as described above.

Based on the above technical solutions, the present disclosure has the following beneficial effects:

In view of the problems of the redox modified plant fiber material, such as high processing temperature, narrow processing temperature window and poor material toughness, the present disclosure reasonably uses a plasticizer based on structural properties of the redox-modified plant fiber. The motion ability of cellulose and hemicellulose molecular chains are improved by ring opening of redox-modified cellulose and hemicellulose. Then intramolecular and intermolecular hydrogen bond effects can be further effectively destroyed by adding the plasticizer, such as the hydroxyl plasticizer, the ionic liquid plasticizer, or the deep eutectic solvent plasticizer. The plasticizer can be well compatible with a redox-modified plant fiber. Therefore, there is a better processing fluidity and broader thermoplastic processing temperature window of the plant fiber by coordinating the particular base material, redox modification and a plasticizer of a particular type. And then, the material thermoplasticity and toughness are also further significantly improved.

The redox-modified plant fiber material with thermoplasticity and toughness prepared in the present disclosure is also inexpensive, biodegradable, environment friendly, etc. The present disclosure provides a high-valued utilization approach of biomass resources, and has broad research prospects. The present disclosure also greatly expands the application range of the full-component plant fiber material, and can play a certain role in replacing a part of the conventional petroleum-based materials.

DETAILED DESCRIPTION OF THE EMBODIMENTS

To facilitate understanding the present disclosure, the present disclosure will be more comprehensively described below with reference to the examples. Preferred examples of the present disclosure are given below. However, the present disclosure may be embodied in many different forms, and is not limited to the examples described herein. These examples are provided to more thoroughly and comprehensively understand the contents disclosed in the present disclosure. It should be understood that the experimental methods without clearly indicated specific conditions in the following examples generally follow conventional conditions or conditions recommended by the manufacturers. Various common reagents used in the examples are commercially available products.

Unless otherwise defined, all technological and scientific terminologies used herein have the same meanings as commonly understood by those skilled in the technical field of the present disclosure. As used in the specification of the present disclosure, the terms are intended to describe specific examples only, and are not intended to limit the present disclosure. As used herein, the term "and/or" includes any and all combinations of one or more of the associated listed items.

The method for controlling thermoplasticity and toughness of a redox-modified plant fiber of the present disclosure includes the following steps: (1) pretreating a plant fiber; (2) oxidation-modifying the pretreated plant fiber, and reduction-modifying the oxidation-modified plant fiber, to obtain the redox-modified plant fiber; and (3) fully mixing a plasticizer with the redox-modified plant fiber; the plasticizer being a hydroxyl plasticizer, an ionic liquid plasticizer, a deep eutectic solvent, an ester plasticizer, an amine plasticizer, a glycidyl plasticizer, or an inorganic salt plasticizer.

The plasticizer in the present disclosure is selected from the group consisting of the hydroxyl plasticizer, the ionic liquid plasticizer, the deep eutectic solvent plasticizer, the ester plasticizer, the amine plasticizer, the glycidyl plasticizer, or the inorganic salt plasticizer.

Alternatively, the hydroxyl plasticizer includes: propanetriol, ethanediol, sorbitol, or xylitol.

Alternatively, the ionic liquid plasticizer includes: 1-butyl-3-methylimidazolium chloride, 1-butyl-3-methylimidazolium acetate, or N-ethylpyridinium tetrafluoroborate.

Alternatively, the deep eutectic solvent plasticizer is a mixture of a hydrogen bond acceptor and a hydrogen bond donor; the hydrogen bond acceptor includes: choline chloride or betaine; and the hydrogen bond donor includes: urea, thiourea, glycerin, butanediol, xylitol, amino acid, or glucose.

Alternatively, the lipid plasticizer includes: diethyl phthalate, trimethyl citrate, ethylene carbonate, or propylene carbonate.

Alternatively, the amine plasticizer includes: urea, acetamide, or amino acid.

Alternatively, the glycidyl ether plasticizer includes: diglycidyl ether, glycol monoglycidyl ether, or glycerol diglycidyl ether.

Alternatively, the inorganic salt plasticizer includes: zinc chloride, lithium chloride, or ferric chloride.

Preferably, the plasticizer is: the hydroxyl plasticizer, the ionic liquid plasticizer, or the deep eutectic solvent plasticizer.

The main principle is: an aggregation state of the plant fiber is a compact micro-nano structure formed from the mutually interweaving of cellulose, hemicellulose and lignin. The three major components, i.e., cellulose, hemicellulose, and lignin, are all polar high polymers with strong intramolecular and intermolecular hydrogen bond effects. And then, cellulose has a high crystallinity. Material properties would affect the selection of the plasticizer. On the basis of improving the motion ability of cellulose and hemicellulose molecular chains by ring opening of redox-modified cellulose and hemicellulose, the plasticizer employed in the present disclosure further effectively destroys intramolecular and intermolecular hydrogen bond effects, and is well compatible with the plant fiber, such that the plant fiber material has better processing fluidity, thus not only broadening the plasticization processing temperature window, but also significantly improving the material thermoplasticity and toughness.

Preferably, a weight ratio of an addition amount of the plasticizer to the redox-modified plant fiber is (0.01-0.5):1. More preferably, the weight ratio of the addition amount of the plasticizer to the redox-modified plant fiber is (0.05-0.25):1. Still more preferably, when the plasticizer is propanetriol (glycerol), the weight ratio of the plasticizer to the redox-modified plant fiber is (0.04-0.2):1, and may further preferably be (0.05-0.15):1; when the plasticizer is the deep eutectic solvent composed of choline chloride and xylitol, the weight ratio of the plasticizer to the redox-modified plant fiber is (0.05-0.25):1, and may further preferably be (0.1-0.2):1; and when the plasticizer is 1-butyl-3-methylimidazolium chloride, the weight ratio of the plasticizer to the redox-modified plant fiber is (0.05-0.25):1, and may further preferably be (0.1-0.2):1.

Alternatively, the plant fiber is selected from the group consisting of: a woody fiber, a gramineae fiber, a leaf fiber, a bark fiber, a hemp fiber, or a wool fiber. Suitable coordination of the plant fiber with a plasticizer can reduce the glass transition temperature of the plant fiber, and further significantly improves the material thermoplasticity and toughness whilst causing the plant fiber material to have better processing fluidity, and a broader processing temperature window.

In some of these embodiments, the plant fiber is modified with a periodate oxidant and a borohydride reductant. Preferably, an oxidant solution is an aqueous solution of a periodate; and/or a reductant solution is an aqueous solution of a borohydride. A weight ratio of the periodate to the plant fiber is (0.5-10):1; and preferably, reaction conditions by stirring after adding the aqueous solution of the periodate are: a reaction temperature of 20-100° C., and a reaction duration of 1-48 h. More preferably, the aqueous solution of the periodate is a sodium periodate solution. In addition, a weight ratio of the borohydride to the plant fiber is (0.1-1):1; preferably, reaction conditions by stirring after adding the aqueous solution of the borohydride are: a reaction temperature of 20-40° C., and a reaction duration of 1-6 h. More preferably, the aqueous solution of the borohydride is a sodium borohydride solution. A suitable ratio of raw materials and suitable reaction conditions contribute to ring opening of cellulose and hemicellulose under the action of a redox reaction of the plant fiber material, and reduce the rigidity of cellulose and hemicellulose molecular chains, whilst reducing intramolecular and intermolecular hydrogen bond effects, and reducing the crystallinity of cellulose, such that small molecular plasticizers can be better embedded between molecular chains of the plant fiber to improve the thermal plasticization effects.

Preferably, the pretreatment of a plant fiber in step (1) further includes: steam explosion after crushing or cutting the plant fiber. More preferably, during the pretreatment of a plant fiber, the plant fiber is crushed to a size range of 5-40 mesh or cut into a length of 5-10 mm, and then pretreated by steam explosion, such that the small molecular plasticizer can be better embedded between the molecular chains of the plant fiber to improve the thermal plasticization effects.

The present disclosure further provides a redox-modified plant fiber material, which can be obtained by hot press molding the modified plant fiber. The hot press molding includes: freeze drying a mixture of a plasticizer and a redox-modified plant fiber laid in a plastic box to obtain a parison, putting the parison into a mold, first prepressing and venting, then hot press molding, and demolding, to obtain a modified plant fiber material with thermoplasticity and toughness. Process conditions in the hot press molding include: a molding temperature of 60-220° C., a molding pressure of 1-15 MPa, and a molding duration of 1-15 min. After processing a plant fiber by the method for controlling thermoplasticity and toughness of a redox-modified plant fiber, the present disclosure can achieve hot press molding at a low temperature, and broaden the processing temperature window, and can prepare the plant fiber material with good toughness and excellent performance by hot press molding within a wide temperature range.

The present disclosure will be more comprehensively described below in conjunction with specific examples.

Example 1

A method for controlling thermoplasticity and toughness of a redox-modified plant fiber and a method for preparing a material specifically include the following steps:

(1) cutting a sisal fiber to 5-10 mm using a fiber cutter.

(2) adding sodium periodate and the sisal fiber cut in step (1) at a weight ratio of 2:1 to an aqueous solution, to prepare a suspension at a concentration of sodium periodate of 20 g/L, then stirring away from light at 60° C. for 4 h, filtering, and washing, to obtain an oxidation-modified sisal fiber.

(3) adding sodium borohydride and the oxidation-modified sisal fiber in step (2) at a weight ratio of 0.5:1 to an aqueous solution, to prepare a suspension at a concentration of sodium borohydride of 5 g/L, stirring at room temperature for 4 h, filtering, and washing, to obtain the redox-modified sisal fiber.

(4) mixing glycerol with the redox-modified sisal fiber in step (3) at a mass ratio of 0.05:1, and fully stirring at room temperature, to obtain a mixture of a plasticizer and the redox-modified sisal fiber.

(5) laying the mixture of the plasticizer and the redox-modified sisal fiber in step (4) in a plastic box, and then freeze drying for 24 h, to obtain a parison.

(6) putting the parison in step (5) into a mold, first prepressing and venting, then hot press molding under process conditions of a molding temperature of 155° C., under a molding pressure of 3 MPa for a molding duration of 5 min, and demolding, to obtain a modified sisal fiber material with thermoplasticity and toughness.

Example 2

A method for controlling thermoplasticity and toughness of a redox-modified plant fibers and a method for preparing a material specifically include the following steps:

(1) cutting a sisal fiber to 5-10 mm using a fiber cutter, and pretreating by steam explosion.

(2) adding sodium periodate and the sisal fiber pretreated by steam explosion in step (1) at a weight ratio of 2:1 to an aqueous solution, to prepare a suspension at a concentration of sodium periodate of 20 g/L, then stirring away from light at 60° C. for 4 h, filtering, and washing, to obtain an oxidation-modified and steam-exploded sisal fiber.

(3) adding sodium borohydride and the oxidation-modified and steam-exploded sisal fibers in step (2) at a weight ratio of 0.5:1 to an aqueous solution, to prepare a suspension at a concentration of sodium borohydride of 5 g/L, stirring at room temperature for 4 h, filtering, and washing, to obtain a redox-modified and steam-exploded sisal fiber.

(4) mixing a deep eutectic solvent composed of choline chloride and xylitol at a mass ratio of 2:1 with the redox-modified and steam-exploded sisal fiber in step (3) at a mass ratio of 0.1:1, and fully stirring at room temperature, to obtain a mixture of a plasticizer and the redox-modified and steam-exploded sisal fiber.

(5) laying the mixture of the plasticizer and the redox-modified and steam-exploded sisal fiber in step (4) in a plastic box, and then freeze drying for 24 h, to obtain a parison.

(6) putting the parison in step (5) into a mold, first prepressing and venting, then hot press molding under process conditions of a molding temperature of 150° C., under a molding pressure of 3 MPa for a molding duration of 5 min, and demolding, to obtain a modified sisal fiber material with thermoplasticity and toughness.

Example 3

A method for controlling thermoplasticity and toughness of a redox-modified plant fiber and a method for preparing a material specifically include the following steps:

(1) cutting a sisal fiber to 5-10 mm using a fiber cutter, and pretreating by steam explosion.

(2) adding sodium periodate and the sisal fiber pretreated by steam explosion in step (1) at a weight ratio of 2:1 to an aqueous solution, to prepare a suspension at a concentration of sodium periodate of 20 g/L, then stirring away from light at 60° C. for 4 h, filtering, and washing, to obtain an oxidation-modified and steam-exploded sisal fiber.

(3) adding sodium borohydride and the oxidation-modified and steam-exploded sisal fiber in step (2) at a weight ratio of 0.5:1 to an aqueous solution, to prepare a suspension at a concentration of sodium borohydride of 5 g/L, stirring at room temperature for 4 h, filtering, and washing, to obtain a redox-modified and steam-exploded sisal fiber.

(4) mixing 1-butyl-3-methylimidazolium chloride with the redox-modified and steam-exploded sisal fiber in step (3) at a mass ratio of 0.2:1, and fully stirring at room temperature, to obtain a mixture of a plasticizer and the redox-modified and steam-exploded sisal fiber.

(5) laying the mixture of the plasticizer and the redox-modified and steam-exploded sisal fiber in step (4) in a plastic box, and then freeze drying for 24 h, to obtain a parison.

(6) putting the parison in step (5) into a mold, first prepressing and venting, then hot press molding under process conditions of a molding temperature of 85° C., under a molding pressure of 3 MPa for a molding duration of 5 min, and demolding, to obtain a modified sisal fiber material with thermoplasticity and toughness.

Comparison Example 1

A method for preparing a plant fiber material includes the following steps:

(1) cutting a sisal fiber to 5-10 mm using a fiber cutter, and pretreating by steam explosion.

(2) adding sodium periodate and the sisal fiber pretreated by steam explosion in step (1) at a weight ratio of 2:1 to an aqueous solution, to prepare a suspension at a concentration of sodium periodate of 20 g/L, then stirring away from light at 60° C. for 4 h, filtering, and washing, to obtain an oxidation-modified and steam-exploded sisal fiber.

(3) adding sodium borohydride and the oxidation-modified and steam-exploded sisal fiber in step (2) at a weight ratio of 0.5:1 to an aqueous solution, to prepare a suspension at a concentration of sodium borohydride of 5 g/L, stirring at room temperature for 4 h, filtering, and washing, to obtain a redox-modified and steam-exploded sisal fiber.

(4) laying the redox-modified and steam-exploded sisal fiber in step (3) in a plastic box, and then freeze drying for 24 h, to obtain a parison.

(5) putting the parison in step (4) into a mold, first prepressing and venting, then hot press molding under process conditions of a molding temperature of 175° C., under a molding pressure of 10 MPa for a molding duration of 5 min, and demolding, to obtain a modified sisal fiber material without adding a plasticizer.

Comparison Example 2

A method for preparing a plant fiber material includes the following steps:

(1) cutting a sisal fiber to 5-10 mm using a fiber cutter, and pretreating by steam explosion.

(2) mixing 1-butyl-3-methylimidazolium chloride with the steam-exploded sisal fiber in step (1) at a mass ratio of 0.2:1, and fully stirring at room temperature, to obtain a mixture of a plasticizer and the steam-exploded sisal fiber.

(3) laying the mixture of the plasticizer and the steam-exploded sisal fiber in step (2) in a plastic box, and then freeze drying for 24 h, to obtain a parison.

(4) putting the parison in step (3) into a mold, first prepressing and venting, then hot pressing under process conditions of a molding temperature of 200° C., under a molding pressure of 10 MPa for a molding duration of 5 min, and demolding. The material cannot be molded. The material obtained by hot pressing is fragile with many defects and poor fiber interface bonding.

Example 4

A method for controlling thermoplasticity and toughness of a redox-modified plant fiber and a method for preparing a material specifically include the following steps:

(1), and by steam explosion.

(2) adding sodium periodate and the eucalyptus fiber pretreated by steam explosion in step (1) at a weight ratio of 2.67:1 to an aqueous solution, to prepare a suspension at a concentration of sodium periodate of 26.7 g/L, then stirring away from light at 50° C. for 6 h, filtering, and washing, to obtain a redox-modified and steam-exploded eucalyptus fiber.

(3) adding sodium borohydride and the oxidation-modified and steam-exploded eucalyptus fiber in step (2) at a weight ratio of 0.5:1 to an aqueous solution, to prepare a suspension at a concentration of sodium borohydride of 5 g/L, stirring at room temperature for 4 h, filtering, and washing, to obtain a redox-modified and steam-exploded eucalyptus fiber.

(4) mixing glycerol with the redox-modified and steam-exploded eucalyptus fiber in step (3) at a mass ratio of 0.1:1, and fully stirring at room temperature, to obtain a mixture of the plasticizer and the redox-modified and steam-exploded eucalyptus fiber.

(5) laying the mixture of the plasticizer and the redox-modified and steam-exploded eucalyptus fiber in step (4) in a plastic box, and then freeze drying for 24 h, to obtain a parison.

(6) putting the parison in step (5) into a mold, first prepressing and venting, then hot press molding under process conditions of a molding temperature of 170° C., under a molding pressure of 5 MPa for a molding duration of 6 min, and demolding, to obtain a modified eucalyptus fiber material with thermoplasticity and toughness.

Example 5

A method for controlling thermoplasticity and toughness of a redox-modified plant fiber and a method for preparing a material specifically include the following steps:

(1) crushing a eucalyptus fiber to 5-40 mesh using a crusher, and pretreating by steam explosion.

(2) adding sodium periodate and the eucalyptus fiber pretreated by steam explosion in step (1) at a weight ratio of 2.67:1 to an aqueous solution, to prepare a suspension at a concentration of sodium periodate of 26.7 g/L, then stirring away from light at 50° C. for 6 h, filtering, and washing, to obtain a redox-modified and steam-exploded eucalyptus fiber.

(3) adding sodium borohydride and the oxidation-modified and steam-exploded eucalyptus fibers in step (2) at a weight ratio of 0.5:1 to an aqueous solution, to prepare a suspension at a concentration of sodium borohydride of 5 g/L, stirring at room temperature for 4 h, filtering, and washing, to obtain a redox-modified and steam-exploded eucalyptus fiber.

(4) mixing a deep eutectic solvent composed of choline chloride and xylitol at a mass ratio of 2:1 with the redox-modified and steam-exploded eucalyptus fiber in step (3) at a mass ratio of 0.2:1, and fully stirring at room temperature, to obtain a mixture of a plasticizer and the redox-modified and steam-exploded eucalyptus fiber.

(5) laying the mixture of the plasticizer and the redox-modified and steam-exploded eucalyptus fiber in step (4) in a plastic box, and then freeze drying for 24 h, to obtain a parison.

(6) putting the parisons in step (5) into a mold, first prepressing and venting, then hot press molding under process conditions of a molding temperature of 145° C., under a molding pressure of 5 MPa for a molding duration of 6 min, and demolding, to obtain a modified eucalyptus fiber material with thermoplasticity and toughness.

Example 6

A method for controlling thermoplasticity and toughness of a redox-modified plant fiber and a method for preparing a material specifically include the following steps:

(1) crushing a eucalyptus fiber to 5-40 mesh using a crusher, and pretreating by steam explosion.

(2) adding sodium periodate and the eucalyptus fiber pretreated by steam explosion in step (1) at a weight ratio of 2.67:1 to an aqueous solution, to prepare a suspension at a concentration of sodium periodate of 26.7 g/L, then stirring away from light at 50° C. for 6 h, filtering, and washing, to obtain a redox-modified and steam-exploded eucalyptus fiber.

(3) adding sodium borohydride and the oxidation-modified and steam-exploded eucalyptus fiber in step (2) at a weight ratio of 0.5:1 to an aqueous solution, to prepare a suspension at a concentration of sodium borohydride of 5 g/L, stirring at room temperature for 4 h, filtering, and washing, to obtain a redox-modified and steam-exploded eucalyptus fiber.

(4) mixing 1-butyl-3-methylimidazolium chloride with the redox-modified and steam-exploded eucalyptus fiber in step (3) at a mass ratio of 0.2:1, and fully stirring at room temperature, to obtain a mixture of a plasticizer and the redox-modified and steam-exploded eucalyptus fiber.

(5) laying the mixture of the plasticizer and the redox-modified and steam-exploded eucalyptus fiber in step (4) in a plastic box, and then freeze drying for 24 h, to obtain a parison.

(6) putting the parison in step (5) into a mold, first prepressing and venting, then hot press molding under process conditions of a molding temperature of 155° C., under a molding pressure of 5 MPa for a molding duration of 6 min, and demolding, to obtain a modified eucalyptus fiber material with thermoplasticity and toughness.

Comparison Example 3

A method for preparing a plant fiber material includes the following steps:

(1) crushing eucalyptus fiber to 5-40 mesh using a crusher, and pretreating by steam explosion.

(2) adding sodium periodate and the eucalyptus fiber pretreated by steam explosion in step (1) at a weight ratio of 2.67:1 to an aqueous solution, to prepare a suspension at a concentration of sodium periodate of 26.7 g/L, then stirring away from light at 50° C. for 6 h, filtering, and washing, to obtain a redox-modified and steam-exploded eucalyptus fiber.

(3) adding sodium borohydride and the oxidation-modified and steam-exploded eucalyptus fiber in step (2) at a weight ratio of 0.5:1 to an aqueous solution, to prepare a suspension at a concentration of sodium borohydride of 5 g/L, stirring at room temperature for 4 h, filtering, and washing, to obtain a redox-modified and steam-exploded eucalyptus fiber.

(4) laying the redox-modified and steam-exploded eucalyptus fiber in step (3) in a plastic box, and then freeze drying for 24 h, to obtain a parison.

(5) putting the parison in step (4) into a mold, first prepressing and venting, then hot press molding under process conditions of a molding temperature of 195° C., under a molding pressure of 15 MPa for a molding duration of 6 min, and demolding, to obtain a modified Eucalyptus fiber material without adding a plasticizer.

Comparison Example 4

A method for preparing a plant fiber material includes the following steps:

(1) crushing a eucalyptus fiber to 5-40 mesh using a crusher, and pretreating by steam explosion.

(2) laying the steam-exploded eucalyptus fiber in step (1) in a plastic box, and then freeze drying for 24 h, to obtain a parison.

(3) putting the parison in step (2) into a mold, first prepressing and venting, then hot pressing under process conditions of a molding temperature of 210° C., under a molding pressure of 15 MPa for a molding duration of 6 min, and demolding. The material cannot be molded. The material obtained by hot pressing is fragile with many defects and poor fiber interface bonding.

TABLE 1

Comparison of Parameters of Plant Fiber Materials Prepared in Examples and Comparison Examples

| | Raw material | Modified | Plasticizer | Plasticizer/ fiber | Hot pressing temperature |
|---|---|---|---|---|---|
| Example 1 | Sisal fiber | Redox | Glycerol | 0.05:1 | 155° C. |
| Example 2 | Sisal fiber | Redox | Deep eutectic solvent composed of choline chloride and xylitol | 0.1:1 | 150° C. |
| Example 3 | Sisal fiber | Redox | 1-butyl-3-methylimidazolium chloride | 0.2:1 | 85° C. |
| Comparison Example 1 | Sisal fiber | Redox | N.A. | N.A. | 175° C. |
| Comparison Example 2 | Sisal fiber | N.A. | 1-butyl-3-methylimidazolium chloride | 0.2:1 | 200° C. |
| Example 4 | Eucalyptus fiber | Redox | Glycerol | 0.1:1 | 170° C. |
| Example 5 | Eucalyptus fiber | Redox | Deep eutectic solvent composed of choline chloride and xylitol | 0.2:1 | 145° C. |
| Example 6 | Eucalyptus fiber | Redox | 1-butyl-3-methylimidazolium chloride | 0.2:1 | 155° C. |
| Comparison Example 3 | Eucalyptus fiber | Redox | N.A. | N.A. | 195° C. |
| Comparison Example 4 | Eucalyptus fiber | N.A. | N.A. | N.A. | 210° C. |

As can be seen from the results in Table 1, the hot pressing temperature of the plant fiber materials prepared in Examples 1-6 is significantly lower than the hot pressing temperature of the plant fiber materials prepared in Comparison Examples 1-4, mainly because appropriate plant fiber materials are used in the Examples, are redox-modified, and coordinated with appropriate plasticizers, such that the materials can be hot press molded at lower temperature conditions. However, no plasticizer is added in Comparison Example 1 and Comparison Example 3, the material is not redox-modified in Comparison Example 2, while the material is not redox-modified, nor is a plasticizer added in Comparison Example 4, and the effect that the redox modification and the plasticizer with the whole plant fiber as the particular base material effectively destroy the intramolecular and intermolecular hydrogen bond effects of the plant fiber in the present disclosure is not achieved. Therefore, a higher hot pressing temperature is required in the Comparison Examples. The material prepared by hot pressing at 200° C. in Comparison Example 2 and the material prepared by hot pressing at 210° C. in Comparison Example 4 are still fragile with many defects and poor fiber interface bonding, and cannot achieve a material with good toughness as prepared in the Examples of the present disclosure.

Dynamic Thermomechanical Testing

Dynamic thermomechanical testing of all of the above modified fiber material is as follows: testing and analysis using DMA242E dynamic mechanical analyzer (NETZSCH-Gerätebau GmbH). The material was tested in a stretching mode, at a vibration frequency of 1 Hz, at a target amplitude of 10 at a scale factor of 1.1. The material was tested in a temperature range of 0-240° C. (or until samples broke), at a heating rate of 3° C./min.

Figure 1:
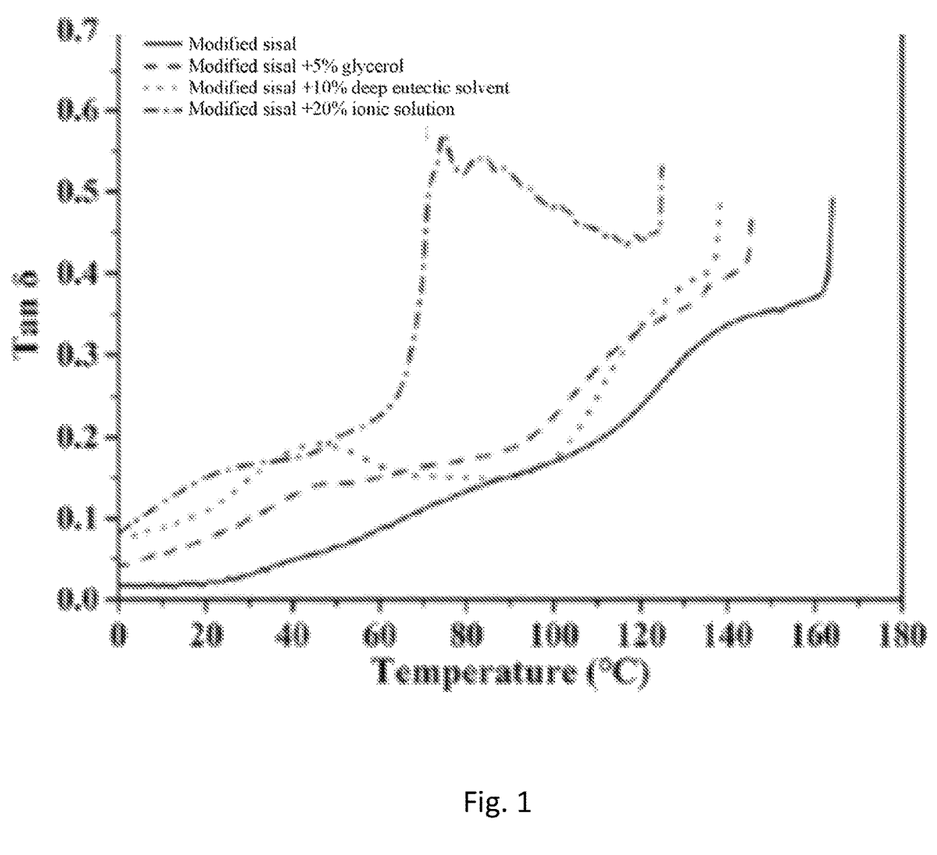
FIG. 1 is a loss factor graph of Example 1, Example 2, Example 3, and Comparison Example 1.
Figure 2:
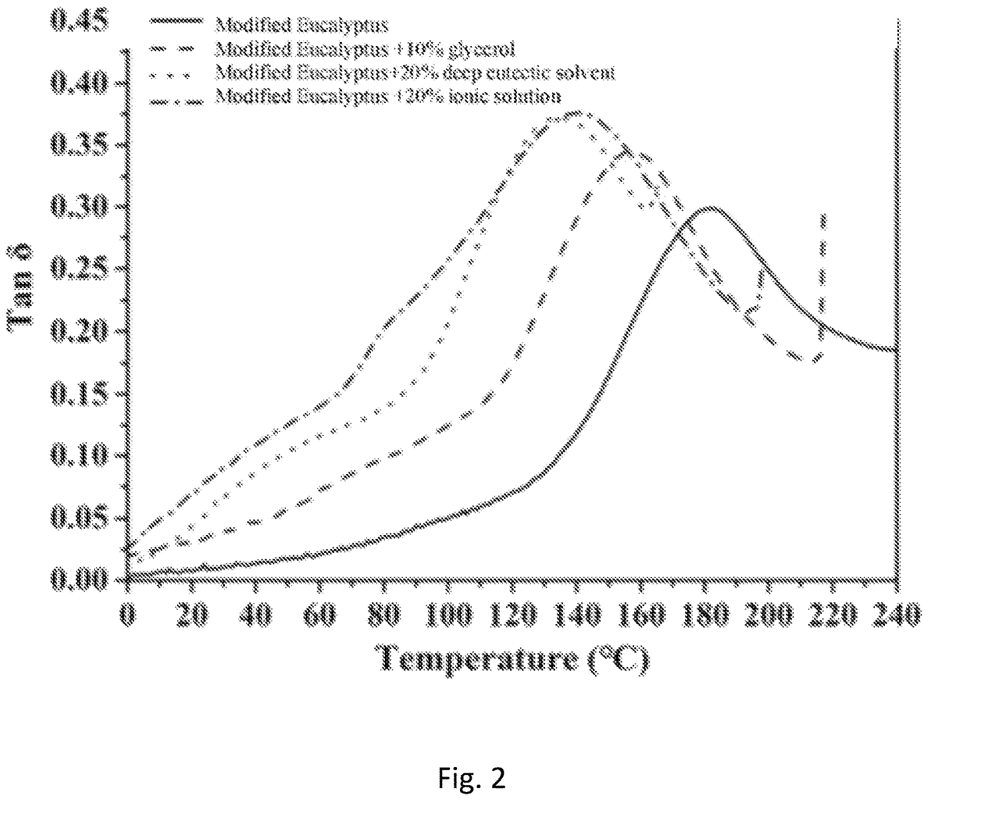
FIG. 2 is a loss factor graph of Example 4, Example 5, Example 6, and Comparison Example 2.

Test results: The loss factor-temperature curves of the modified sisal fiber materials prepared in Example 1, Example 2, Example 3, and Comparison Example 1 are shown in FIG. 1. The loss factor-temperature curves of the modified Eucalyptus fiber materials prepared in Example 4, Example 5, Example 6, and Comparison Example 2 are shown in FIG. 2.

The shoulder peaks and main peaks appearing in the loss factor-temperature curves correspond to a glass transition temperature 1 and a glass transition temperature 2 of the materials respectively. The glass transition temperature 1 is: segment motion of dialcohol cellulose and dialcohol hemicellulose; the glass transition temperature 2 is: limited motion in a molecular chain level of crystallization interval dialcohol cellulose and dialcohol hemicellulose. The specific results are shown in Table 2.

TABLE 2

Glass Transition Temperature 1, Glass Transition Temperature 2, and Processing Temperature Range

| | Glass transition temperature 1 (° C.) | Glass transition temperature 2 (° C.) | Processing temperature range (° C.) |
|---|---|---|---|
| Example 1 | 49 | 145 | 155-200 |
| Example 2 | 46 | 137 | 147-200 |
| Example 3 | 31 | 74 | 84-200 |
| Comparison Example 1 | 90 | 162 | 172-200 |
| Comparison Example 2 | Failure in molding | | |
| Example 4 | 80 | 156 | 166-210 |
| Example 5 | 63 | 135 | 145-210 |
| Example 6 | 58 | 141 | 151-210 |
| Comparison Example 3 | 100 | 182 | 192-210 |
| Comparison Example 4 | Failure in molding | | |

As can be seen from Table 2, compared with Comparison Example 1, the glass transition temperature and the flexible molecular chain motion temperature of the preparation method in Examples 1-3 are lower, such that the processing temperature range is wider, while in Comparison Example 1, the glass transition temperature and the flexible molecular chain motion temperature are high, and the lowest processing temperature is high, such that the processing temperature range is very narrow, showing that the material is redox-modified in Examples 1-3 to have certain thermoplastification processing performance, but still have very narrow processing temperature range. After adding the plasticizer on the basis of the redox modification, the glass transition temperature and the flexible molecular chain motion temperature of the material are decreased to different extents based on the kind and ratio of the plasticizer, the thermoplasticity is significantly improved, and the processing temperature range is significantly broadened accordingly.

Figure 3:
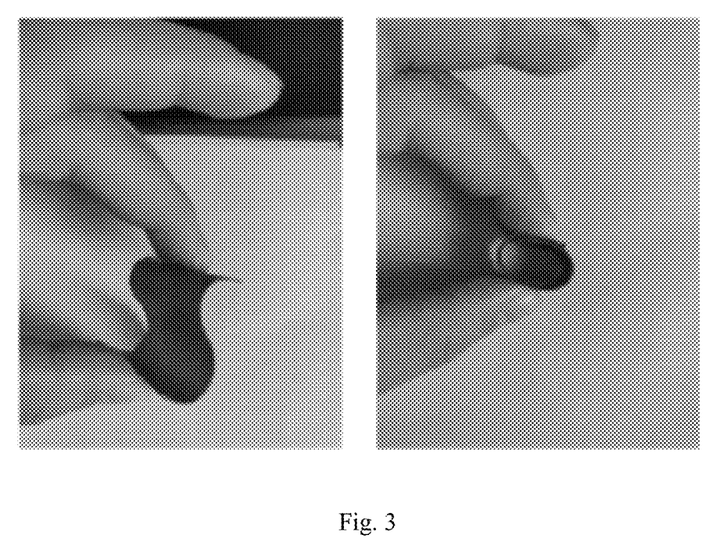
FIG. 3 is a modified sisal fiber material with thermoplasticity and toughness prepared in Example 1.
Figure 4:
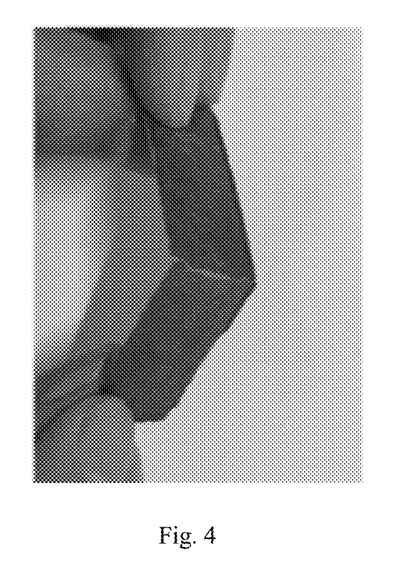
FIG. 4 is a redox-modified sisal fiber material without adding a plasticizer prepared in Comparison Example 1.

The modified sisal fiber material with thermoplasticity and toughness prepared in accordance with the method described in Example 1 is shown in FIG. 3. The redox-modified sisal fiber material without adding a plasticizer prepared in accordance with the method described in Example 1 is shown in FIG. 4. The materials prepared in Comparison Example 2 and Comparison Example 4 are fragile with many defects and poor fiber interface bonding. Thus, the material prepared by the method of the present disclosure has good toughness.

Various technical features of the above examples can be combined discretionarily. For the ease of description, not all possible combinations of the various features in the above examples are described. However, as long as a combination of these features does not have a conflict, the combination should be considered as falling within the scope disclosed in the present specification.

The above examples only show a few embodiments of the present disclosure, and the description thereof is specific and detailed, but the examples cannot be understood as limiting the scope of the present disclosure accordingly. It should be pointed out that those of ordinary skills in the art can further make a number of alterations and improvements without departing from the concept of the present disclosure, and all these alterations and improvements fall within the scope of protection of the present disclosure. Therefore, the scope of protection of the present disclosure shall be defined by the appended claims.

What is claimed is:

1. A method for controlling thermoplasticity and toughness of a redox-modified plant fiber, consisting of following steps:
   (1) pretreating a plant fiber;
   (2) oxidation-modifying the pretreated plant fiber, and reduction-modifying the oxidation-modified plant fiber, to obtain the redox-modified plant fiber; and
   (3) fully mixing a plasticizer with the redox-modified plant fiber; the plasticizer being a hydroxyl plasticizer, an ionic liquid plasticizer, a deep eutectic solvent, an ester plasticizer, an amine plasticizer, a glycidyl plasticizer, or an inorganic salt plasticizer.

2. The method according to claim 1, wherein the hydroxyl plasticizer comprises: propanetriol, ethanediol, sorbitol, or xylitol; and/or
   the ionic liquid plasticizer comprises: 1-butyl-3-methylimidazolium chloride, 1-butyl-3-methylimidazolium acetate, or N-ethylpyridinium tetrafluoroborate; and/or
   the deep eutectic solvent plasticizer is a mixture of a hydrogen bond acceptor and a hydrogen bond donor; the hydrogen bond acceptor comprises: choline chloride or betaine; and the hydrogen bond donor comprises: urea, thiourea, glycerin, butanediol, xylitol, amino acid, or glucose; and/or
   the lipid plasticizer comprises: diethyl phthalate, trimethyl citrate, ethylene carbonate, or propylene carbonate; and/or
   the amine plasticizer comprises: urea, acetamide, or amino acid; and/or
   the glycidyl ether plasticizer comprises: diglycidyl ether, glycol monoglycidyl ether, or glycerol diglycidyl ether; and/or
   the inorganic salt plasticizer comprises: zinc chloride, lithium chloride, or ferric chloride.

3. The method according to claim 2, wherein the plasticizer is: the hydroxyl plasticizer, the ionic liquid plasticizer, or the deep eutectic solvent plasticizer.

4. The method according to claim 1, wherein a weight ratio of an addition amount of the plasticizer to the redox-modified plant fiber is (0.01-0.5):1.

5. The method according to claim 1, wherein the plant fiber is selected from the group consisting of: a woody fiber, a gramineae fiber, a leaf fiber, a bark fiber, a hemp fiber, and a wool fiber.

6. The method according to claim 1, wherein the preprocessing a plant fiber comprises: mechanical crushing, grinding, homogenizing, and steam explosion.

7. The method according to claim 1, wherein an oxidant used in the oxidation-modifying the preprocessed plant fiber is a periodate, and a reductant used in the reduction-modifying the oxidation-modified plant fiber is a borohydride.

8. The method according to claim 7, wherein a weight ratio of the periodate to the plant fiber is (0.5-10):1, and reaction conditions are: a reaction temperature of 20-100° C. and a reaction duration of 1-48 h.

9. The method according to claim 7, wherein a weight ratio of the borohydride to the plant fiber is (0.1-1):1; and the reaction conditions after adding the borohydride reductant are: the reaction temperature of 20-40° C., and the reaction duration of 1-6 h.

10. The method according to claim 2, wherein a weight ratio of an addition amount of the plasticizer to the redox-modified plant fiber is (0.01-0.5):1.

11. The method according to claim 3, wherein a weight ratio of an addition amount of the plasticizer to the redox-modified plant fiber is (0.01-0.5):1.

12. The method according to claim 2, wherein the plant fiber is selected from the group consisting of: a woody fiber, a gramineae fiber, a leaf fiber, a bark fiber, a hemp fiber, and a wool fiber.

13. The method according to claim 3, wherein the plant fiber is selected from the group consisting of: a woody fiber, a gramineae fiber, a leaf fiber, a bark fiber, a hemp fiber, and a wool fiber.

14. The method according to claim 2, wherein the preprocessing a plant fiber comprises: mechanical crushing, grinding, homogenizing, and steam explosion.

15. The method according to claim 3, wherein the preprocessing a plant fiber comprises: mechanical crushing, grinding, homogenizing, and steam explosion.

16. The method according to claim 2, wherein an oxidant used in the oxidation-modifying the preprocessed plant fiber is a periodate, and a reductant used in the reduction-modifying the oxidation-modified plant fiber is a borohydride.

17. The method according to claim 16, wherein a weight ratio of the periodate to the plant fiber is (0.5-10):1, and reaction conditions are: a reaction temperature of 20-100° C. and a reaction duration of 1-48 h.

18. The method according to claim 3, wherein an oxidant used in the oxidation-modifying the preprocessed plant fiber is a periodate, and a reductant used in the reduction-modifying the oxidation-modified plant fiber is a borohydride.

19. The method according to claim 18, wherein a weight ratio of the periodate to the plant fiber is (0.5-10):1, and reaction conditions are: a reaction temperature of 20-100° C. and a reaction duration of 1-48 h.

\* \* \* \* \*